US009235326B2

(12) United States Patent
Anderson et al.

(10) Patent No.: US 9,235,326 B2
(45) Date of Patent: Jan. 12, 2016

(54) MANIPULATION OF USER INTERFACE CONTROLS

(71) Applicant: International Business Machines Corporation, Armonk, NY (US)

(72) Inventors: Erik D Anderson, Austin, TX (US); William A Griffith, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/721,678

(22) Filed: Dec. 20, 2012

(65) Prior Publication Data

US 2014/0181714 A1 Jun. 26, 2014

(51) Int. Cl.
| | |
|---|---|
| *G06F 3/048* | (2013.01) |
| *G06F 3/0482* | (2013.01) |
| *G06F 3/0481* | (2013.01) |
| *G06F 3/0488* | (2013.01) |
| *G06F 3/0486* | (2013.01) |
| *G06F 3/038* | (2013.01) |
| *G06F 3/01* | (2006.01) |
| *G06F 3/0484* | (2013.01) |

(52) U.S. Cl.
CPC ............ *G06F 3/0482* (2013.01); *G06F 3/0488* (2013.01); *G06F 3/04812* (2013.01); *G06F 3/04817* (2013.01); *G06F 3/016* (2013.01); *G06F 3/038* (2013.01); *G06F 3/0481* (2013.01); *G06F 3/0486* (2013.01); *G06F 3/04842* (2013.01); *G06F 2203/04805* (2013.01)

(58) Field of Classification Search
CPC ..... G06F 3/0481; G06F 3/0486; G06F 3/038; G06F 3/016; G06F 3/04842; G06F 3/04817; G06F 3/0482

USPC .................. 715/769, 835, 823; 345/146, 157
See application file for complete search history.

(56) References Cited

U.S. PATENT DOCUMENTS

| | | | | |
|---|---|---|---|---|
| 5,565,888 | A | * 10/1996 | Selker | 715/823 |
| 6,642,947 | B2 | * 11/2003 | Feierbach | 715/861 |
| 7,506,275 | B2 | 3/2009 | Conradt et al. | |
| 7,552,402 | B2 | 6/2009 | Bilow | |

(Continued)

OTHER PUBLICATIONS

Masui et al. "Elastic Graphical Interfaces for Precise Data Manipulation" ACM Conference on Human Factors in Computing Systems (CHI'95) Conference Companion, (Apr. 1995), pp. 143-144.

(Continued)

*Primary Examiner* — Patrick Riegler
*Assistant Examiner* — Mong-Shune Chung
(74) *Attorney, Agent, or Firm* — Jeffrey T. Holman

(57) ABSTRACT

A computer program product is described. The computer program product includes a computer useable storage medium including a computer readable program. The computer readable program includes instructions that, when executed by a processing device within a computer, cause the computer to perform operations. The operations include displaying an attraction icon on a display device, moving the attraction icon relative to a user interface control on the display device. The operations further include moving the user interface control from a first position on the display device to a second position to facilitate manipulation of the user interface control by a user, and restoring the user interface control to the first position in response to completion of the manipulation of the user interface control by the user.

17 Claims, 7 Drawing Sheets

(56) References Cited

U.S. PATENT DOCUMENTS

| | | |
|---|---|---|
| 7,647,565 B2 | 1/2010 | Hayes, Jr. et al. |
| 7,770,120 B2 | 8/2010 | Baudisch |
| 2005/0097479 A1 | 5/2005 | Takabe et al. |
| 2009/0079813 A1* | 3/2009 | Hildreth .................... 348/14.03 |
| 2010/0169828 A1 | 7/2010 | Kho et al. |
| 2010/0333042 A1 | 12/2010 | Yoshii |
| 2011/0055773 A1 | 3/2011 | Agarawala et al. |
| 2011/0225528 A1 | 9/2011 | Breedvelt-Schouten et al. |
| 2011/0302528 A1 | 12/2011 | Starr |

OTHER PUBLICATIONS

Sarkar et al. "Manipulating Screen Space with StretchTools: Visualizing Large Structure on Small Screen" Department of Computer Science, Brown University, Technical Report CS-92-42, (Sep. 1992), 11 pages.

* cited by examiner

MANIPULATION OF USER INTERFACE CONTROLS

BACKGROUND

Mobile devices are common place today. One issue with manipulating applications on a mobile device is the small amount of real estate or display area. Many user interface controls originally designed for standard monitors are allotted limited space on a display area. Often, many of these controls are located at the edge of the display area in order to reserve the center of the display area for viewing data and images. When these controls are close together, or close to the edge of the display area, attempting to select a specific control can result in selection of an unwanted user interface control.

SUMMARY

Embodiments of a system are described. In one embodiment, the system is a computer program product. The computer program product includes a computer useable storage medium including a computer readable program. The computer readable program includes instructions that, when executed by a processing device within a computer, cause the computer to perform operations. The operations include displaying an attraction icon on a display device, moving the attraction icon relative to a user interface control on the display device. The operations further include moving the user interface control from a first position on the display device to a second position to facilitate manipulation of the user interface control by a user, and restoring the user interface control to the first position in response to completion of the manipulation of the user interface control by the user. Other embodiments of the system are also described, as well as embodiments of an apparatus and a method.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
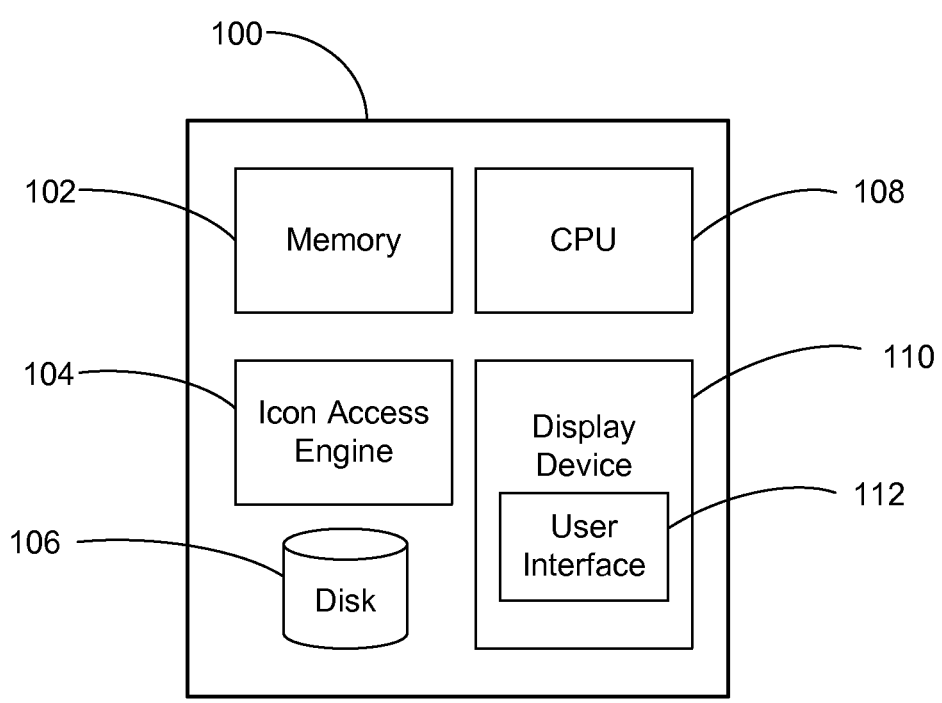
FIG. 1 depicts a schematic diagram of one embodiment of a computer system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate manipulation of user interface controls on a display device. A user interface control may be an icon, a link, or any other graphical representation of a user input node where the user communicates with a part or portion of the computer system. In many instances, it is difficult to accurately select and manipulate relatively small icons or user interface controls on a display. The controls may be small and positioned close together. Some embodiments facilitate identifying, resizing, and/or repositioning the control icons to make it easier for a user to interact with such icons. In other instances, the icons or user interface controls may be positioned close to the perimeter of a display area or screen as the center of the display area is reserved for more relevant content. Positioning user interface controls on the peripheral of a user interface display may complicate accurately selecting and manipulating the controls. Some embodiments facilitate moving the controls closer to the center of the user interface to facilitate manipulation of the controls. Also, multiple controls or icons may be positioned relatively close together further confounding a user from correctly selecting the desired control. Some embodiments facilitate temporarily repositioning multiple icons or controls to a more desired position on the display and restoring the controls to their respective original positions on the display after manipulation. Some embodiments significantly reduce or eliminate user errors, allowing the user to accurately select a desired icon or control more frequently. Accurate selection of controls reduces user frustration and increases user satisfaction. Users may also be more efficient as they are not constantly selecting incorrect controls or icons, wasting time and energy exiting undesired applications or controls.

FIG. 1 depicts a schematic diagram of one embodiment of a computer system 100. Although the computer system 100 is shown and described with certain components and functionality, other embodiments of the computer system 100 may include fewer or more components to implement less or more functionality. The illustrated computer system 100 includes a computer memory device 102, an icon access engine 104, and a disk storage device 106. The illustrated computer system 100 also includes a processing device 108, and a display device 110, configured to display a user interface 112. The computer system 100 may be a mobile phone, a smart phone, a portable media device, a tablet computer, a laptop computer, a desktop computer, or other device.

The computer memory device 102 may store data and/or software instructions or computer program instructions for carrying out the operations described herein. The computer memory device 102 may be external or internal to the computer system and may include but is not limited to a hard drive, a CD/DVD recordable drive, a magnetic tape drive, a disk cartridge drive, a secure digital card, another type of magnetic or optical drive, a solid-state drive, or another type of memory device. The disk storage device 106 may be implemented to temporarily store data or software instructions from the memory device 102 or the processor 108. The disk storage device 106 may include but is not limited to a hard disk drive, a floppy disk drive, a removable floppy disk, or other type of optical or magnetic drive. The processing device 108 is connected to and in communication with the memory device 102 and may store and access data on the memory device 102 for performing the operations described herein. The processor or processing device 108 may also be connected to the disk storage device 106. The functionality of one or more components of the icon access engine 104 may be implemented by computer program instructions stored on the computer memory device 102 and executed by the processing device 108 such as a CPU.

The display device 110 shown in FIG. 1 may be an input/output device configured to display a user interface 112 corresponding to the computer system 100. The display device 110 may be a touch display device capable of interpreting touch gestures. The touch gestures may be used to perform various actions in the computer system 100 including to implement the method(s) described herein. The computer system 100 may also include other input/output devices that allow the user to interact with the user interface 112, including but not limited to keyboards, displays, and pointing devices and may be coupled to the system either directly or indirectly.

Figure 2:
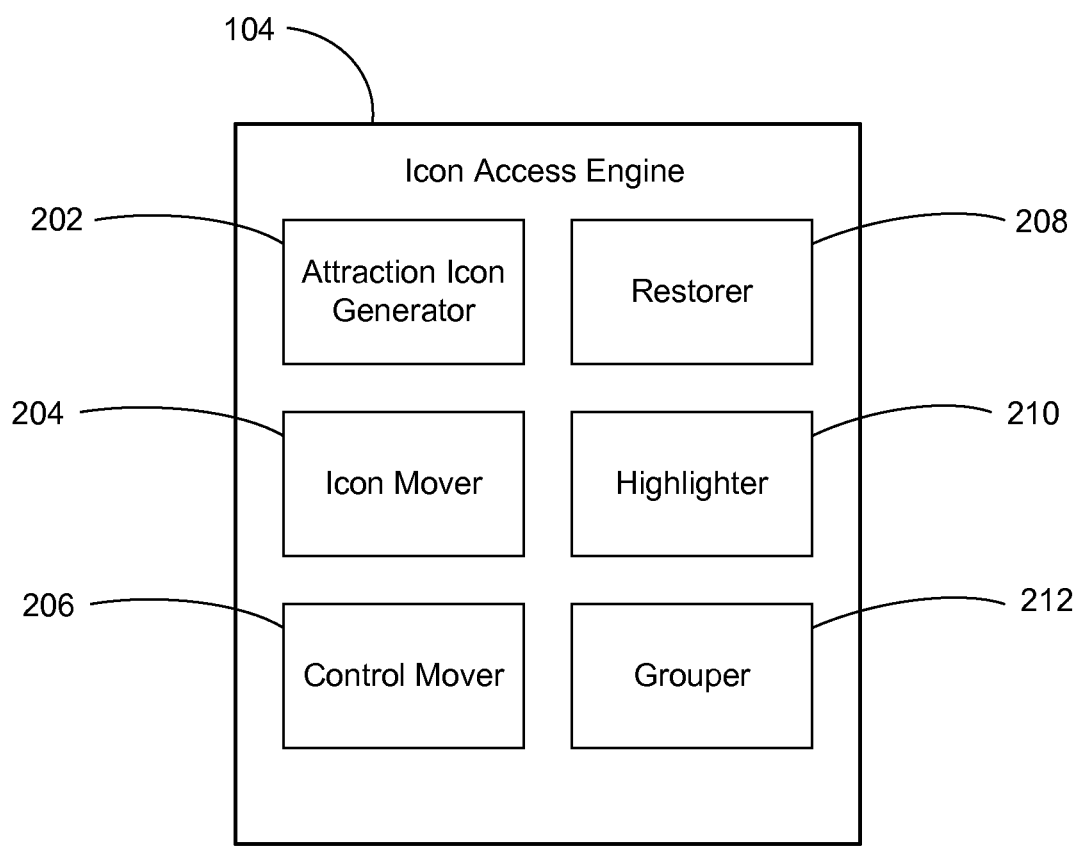
FIG. 2 depicts a schematic diagram of one embodiment of the icon access engine of FIG. 1.

FIG. 2 depicts a schematic diagram of one embodiment of the icon access engine 104 of FIG. 1. The illustrated icon access engine 104 includes various components that are capable of performing the functions and operations described herein. In one embodiment, the components of the icon access engine 104 are implemented in the computer system 100. For example, the functionality of the components of the icon access engine 104 may be implemented by computer program instructions stored on the computer memory device 102 and executed by the processing device 108. In some embodiments, the icon access engine 104 includes an attraction icon generator 202, an icon mover 204, a control mover 206, a restorer 208, a highlighter 210, and a grouper 212. The icon access engine 104 may include more or fewer components or subsystems than those depicted herein. In some embodiments, the icon access engine 104 may be used to implement the methods described herein.

In some embodiments, the attraction icon generator 202 is configured to display an attraction icon (see FIG. 3A) on the display device 110. The attraction icon may be a graphical image represented visually on the user interface 112 of the display device 110. In some embodiments, the attraction icon is different from a default pointer. In one embodiment, the icon mover 204 is configured to move the attraction icon on the display device 110 relative to a user interface control (see FIG. 3A). In one embodiment, the relative movement may include translating the attraction icon on the display device 110 in a direction towards the user interface control. In another embodiment, the relative movement may include rotating the attraction icon to orient the attraction icon in a direction towards the user interface control. In some embodiments, the relative movement may include a combination of translating and rotating the attraction icon relative to the user interface control. The relative movement may also include resizing the attraction icon relative to the user interface control, or any other type of movement relative to the user interface control.

In some embodiments, the control mover 206 is configured to move the user interface control from a first position to a second position on the display device 110. Moving the user interface control to a second position on the display device 110 allows easier access to the user interface control by the user and facilitates manipulation of the user interface control. In one embodiment, the user interface control may translate from the first position to the second position. In one embodiment, the user interface control may resize on the display device 110. Increasing or decreasing the size of the user interface control may ease manipulation by the user. In another embodiment, the user interface control may rotate on the display. The movement may be any combination of translating, rotating, or resizing, or any other relative movement on the display device 110.

In some embodiments, the control mover 206 is configured to move one or more controls each from their original position on the display device 110 to respective second positions on the display device 110. In some embodiments, the movement of each user interface control may differ depending upon a parameter relating the attraction icon and each user interface control. In one embodiment, the parameter may be a measure of the distance between the attraction icon and each user interface control. As the distance differs, the movement of each user interface control differs. In one embodiment, the resizing of the user interface control differs as the distance differs. For example, the relative movement or resizing may increase as the attraction icon gets closer to the user interface control. The relative movement or resizing of each of the plurality of user interface controls may gradually decrease as the distance increases. In some embodiments, the parameter may be a measure of the directional alignment of the attraction icon and each user interface control. As the attraction icon rotates and orients in a direction towards the user interface control, the user interface control will move or resize. The movement or resizing of each user interface control may increase as the alignment of the attraction increases and gradually decrease as the alignment decreases.

In some embodiments, the restorer 208 is configured to move the user interface control from the second position back to the first position (e.g., an original position) after the user completes manipulation of the control. In one embodiment, the user interface control reverts back to its original position in response to the completion. In one embodiment, the user interface control also reverts back to its original size upon completion of the manipulation.

In some embodiments, the highlighter 210 is configured to highlight or visually emphasize a user interface control. The highlighting or visual emphasis may include but is not limited to bolding, coloring, resizing, underlining, italicizing, distorting, brightening, darkening, moving, or any other way known to visually indicate a difference between the desired user interface control and other user interface controls on the display device 110. In another embodiment, the computer system 100 may include a speaker to audibly indicate the desired user interface control to the user. User interface controls may be close together on a display making it difficult for the user to select the correct user interface control. Providing a visual cue or representation allows the user to know which user interface control(s) will be moved to a second position.

In some embodiments, the highlighter 210 is configured to highlight or visually emphasize more than one user interface control. In some embodiments, the visual emphasis of each user interface control may differ depending upon a parameter relating the attraction icon and each user interface control. In one embodiment, the parameter may be a measure of the distance between the attraction icon and each user interface control. As the distance differs, the visual emphasis of the user interface control differs. In one embodiment, the visual emphasis of each user interface control differs because each user interface control is positioned a different distance from the attraction icon. The visual emphasis may increase as the attraction icon gets closer to the user interface control. The visual emphasis of each of the plurality of user interface controls may gradually decrease as the distance increases. In some embodiments, the parameter may be a measure of the directional alignment of the attraction icon and each user interface control. As the attraction icon rotates and orients in a direction towards the user interface control, the user interface control will move or resize, or otherwise be emphasized. The visual emphasis of each user interface control may increase as the alignment of the attraction icon with the user interface control increases and gradually decrease as the alignment decreases. The parameter may also be any other logical measure relating the attraction icon and the user interface controls.

In some embodiments, the grouper 212 is configured to group more than one user interface control together, thereby allowing the user to move, resize, rotate, or highlight more than one user interface control at the same time. The grouper 212 may be configured to group more than one user interface control together according to established criteria. The criteria may be the user interface controls' proximity, similarity in function, location, or other logical criteria for distinguishing the desired user interface controls from other user interface controls on the display device 110. In this way, the grouper 212 allows the user to group more than one user interface control together thereby allowing the user to move, rotate, resize, or highlight more than one user interface control.

Figure 3A:
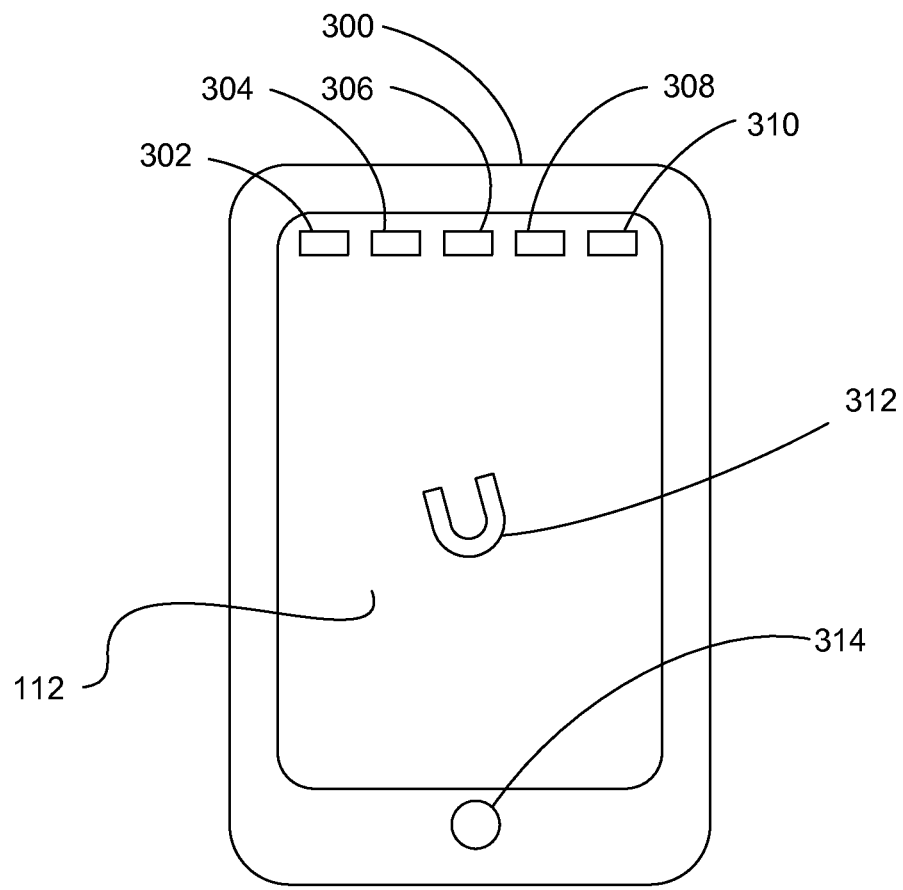
FIG. 3A depicts one embodiment of a user interface of a mobile computing device showing an attraction icon and several user interface controls located at a top perimeter of the user interface.

FIG. 3A depicts one embodiment of a user interface 112 of a mobile computing device 300 showing an attraction icon 312 and several user interface controls 302-310 located at a top perimeter of the user interface 112. In other embodiments, the user interface controls 302-310 may be located anywhere on the user interface 112. The mobile computing device 300 may include but is not limited to a mobile phone, a tablet computer, a laptop, or other mobile computing device. The user interface 112 may be configured to process user input/output (I/O) commands, including selection of one or more user interface controls 302-310. The user interface controls 302-310 may allow a user to input data, select data, categorize data, search data, launch an application (i.e., app) or otherwise interact with the mobile computing device 300. The user interface controls 302-310 may be icons, links, or any other types of input nodes. The user interface controls 302-310 might include a search box, a drop-down list, a link, etc. Also shown on the user interface 112 is an attraction icon 312. Although the attraction icon 312 is shown with a specific graphical depiction—a horseshoe magnet—other embodiments may utilize other graphical or visual elements to represent the location and/or orientation of the attraction icon 312 on the user interface 112. FIG. 3A also shows an input button 314 external to the user interface 112.

Figure 3B:
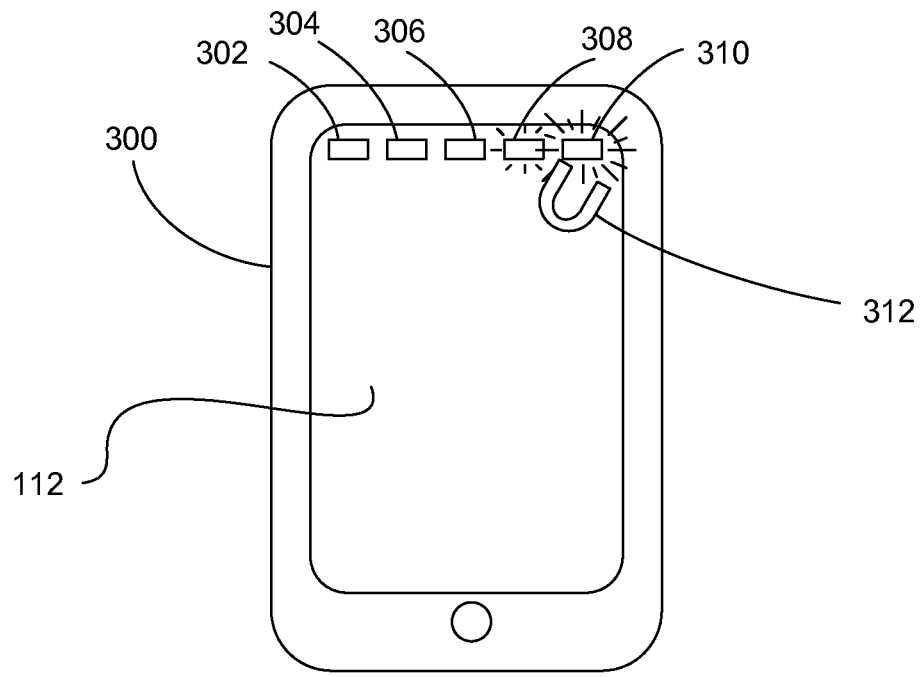
FIG. 3B depicts one embodiment of the mobile computing device of FIG. 3A with visual emphasis of user interface controls.

FIG. 3B depicts one embodiment of the mobile computing device 300 of FIG. 3A with visual emphasis of the user interface controls 308 and 310. In this embodiment, the attraction icon 312 has moved relative to the user interface controls 302-310. The movement of the attraction icon 312, as shown in FIG. 3B, includes translation and rotation from the position of the attraction icon 312 depicted in FIG. 3A. In other embodiments, the movement of the attraction icon 312 may include translating, rotating, resizing, or any other type of movement relative to one or more of the user interface controls 302-310. In particular, FIG. 3B shows the attraction icon 312 moved to a position near user interface control 308 and user interface control 310. Additionally, the attraction icon 312 is oriented primarily toward the user interface control 310. The movement and orientation of the attraction icon 312 is in response to an input by the user. The input may be through a touch sensitive interface, through the input button 314, or through another input device.

In response to the movement (e.g., translation and orientation) of the attraction icon 312 relative to the user interface control 310, the user interface control 310 is visually emphasized on the user interface 112. The visual emphasis may be bolding, highlighting, coloring, underlining, italicizing, distorting, brightening, darkening, resizing, moving, or any other visual representation on the user interface 112. In one embodiment, the highlight or visual emphasis may indicate to the user which user interface control will be moved from a first position to a second position on the user interface 112. In some embodiments, more than one user interface control may be visually emphasized. FIG. 3B also shows user interface control 308 visually emphasized. The visual emphasis of user interface control 308 may be less than the visual emphasis of user interface control 310. The different level of visual emphasis may be based on a distance between the attraction icon 312 and each user interface control, the orientation of the attraction icon relative to each user interface control, and so forth. As the attraction icon 312 is closer to the user interface control 310 or oriented in a direction towards the user interface control 310 the level of visual emphasis of user interface control 310 is greater than the level of visual emphasis of user interface control 308. In some embodiments, another logical parameter relating the attraction icon 312 and the user interface controls 302-310 dictates the level of visual emphasis. The visual emphasis may also include more than one user interface control, indicating a group of user interface controls set to be moved to respective second positions on the user interface 112.

Figure 3C:
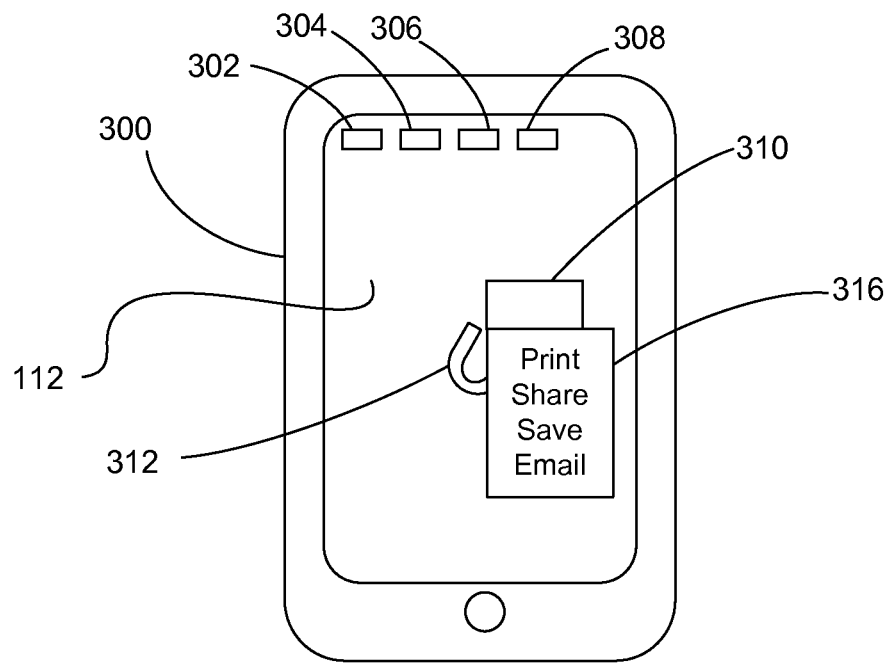
FIG. 3C depicts one embodiment of the mobile computing device of FIGS. 3A and 3B with the user interface showing the user interface control resized and moved to a second position and the user interface control showing expanded options.

FIG. 3C depicts one embodiment of the mobile computing device 300 of FIGS. 3A and 3B with the user interface 112 showing the user interface control 310 resized and moved to a second position and the user interface control 310 showing expanded options 316. In this embodiment, the user interface control 310 has moved from the first position to a second position on the user interface 112. In other embodiments, more than one user interface control may be moved. In this embodiment, the user interface control 310 is resized when moved to the second position to allow easier manipulation of the user interface control 310. Increasing the size of the user interface control 310 may improve the user's ability to manipulate the user interface control 310 correctly, especially for small screen devices. The user interface control 310 shows expanded options 316 in a drop-down list. In some embodiments, once the user finishes manipulation of the user interface control 310, the user interface control 310 will restore to the first position on the user interface 112 as depicted in FIGS. 3A and 3B.

Figure 3D:
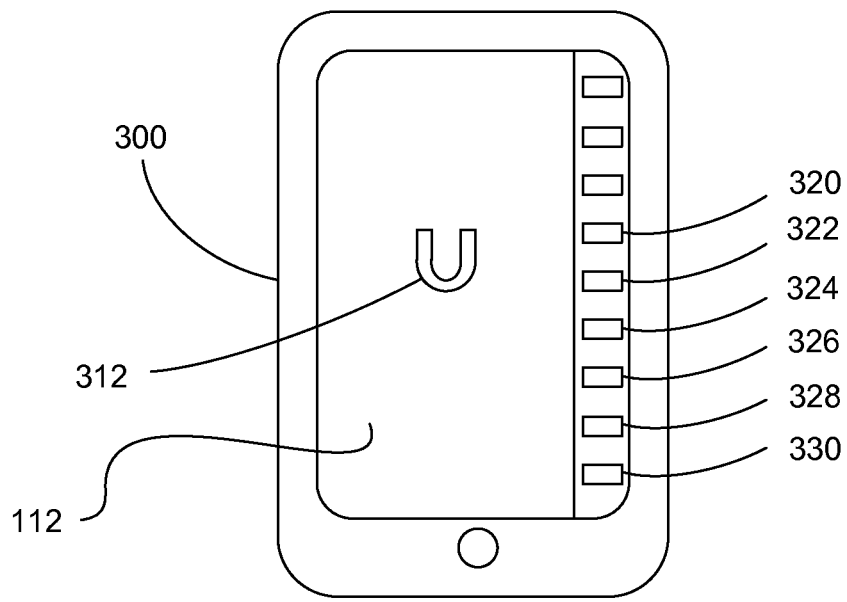
FIG. 3D depicts another embodiment of a user interface of a mobile computing device showing an attraction icon and several user interface controls located at a side perimeter of the user interface.
Figure 3E:
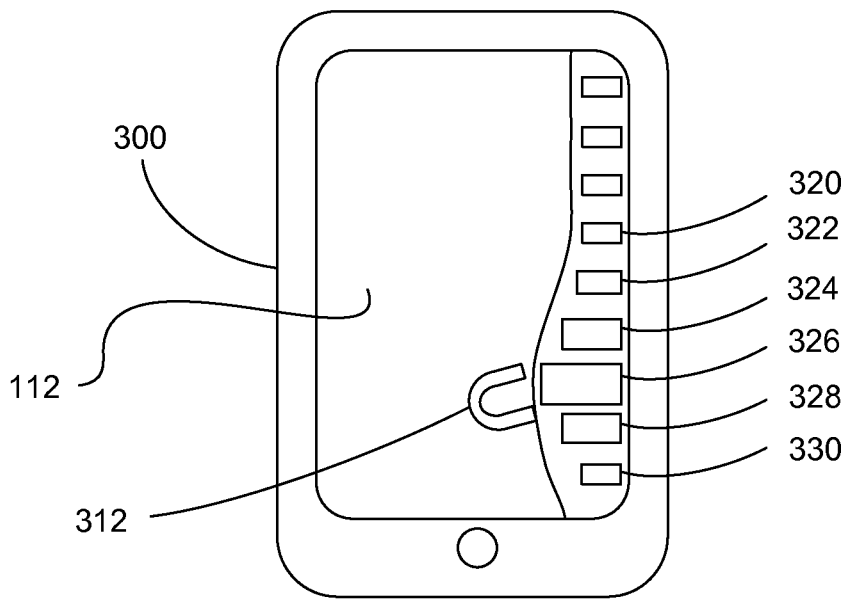
FIG. 3E depicts one embodiment of the mobile computing device of FIG. 3D showing resizing and movement of user interface controls towards the attraction icon.

The embodiments depicted in FIGS. 3A, 3B, and 3C are for reference only. FIGS. 3D and 3E depict another approach. FIG. 3D depicts another embodiment of a user interface 112 of a mobile computing device 300 showing an attraction icon 312 and several user interface controls 320-330 located at a side perimeter of the user interface 112. In other embodiments, the user interface controls 320-330 may be located anywhere on the user interface 112. FIG. 3D shows the user interface controls 320-330 in their original positions along the side perimeter of the user interface 112.

FIG. 3E depicts one embodiment of the mobile computing device 300 of FIG. 3D showing the user interface controls 322-328 resized and moved towards the attraction icon 312. In this embodiment, the attraction icon 312 has moved relative to the user interface controls 320-330. The movement of the attraction icon 312, as shown in FIG. 3E, includes translation and rotation from the position of the attraction icon 312 depicted in FIG. 3D. In other embodiments, the movement of the attraction icon 312 may include translating, rotating, resizing, or any other type of movement relative to one or more of the user interface controls 320-330. In particular, FIG. 3E shows the attraction icon 312 moved to a position near user interface controls 326 and 328. Additionally, the attraction icon 312 is oriented primarily toward the user interface control 326. The movement and orientation of the attraction icon 312 is in response to an input by the user.

In response to the movement (e.g. translation and orientation) of the attraction icon 312 relative to the user interface control 326, the user interface control 326 has resized and moved to a second position on the user interface 112. In some embodiments, more than one user interface control may move. FIG. 3E also shows the user interface controls 322, 324, and 328 each have resized and moved to a second position in response to the relative movement of the attraction icon 312. In some embodiments, the user interface controls 320-330 dynamically respond to movement of the attraction icon 312, enlarging and shrinking as the attraction icon 312 moves nearer to and farther from each user interface control 320-330. FIG. 3E depicts a gradual decrease of visual emphasis between the user interface controls 322-328. In this embodiment, the level of visual emphasis of each user interface control 322-328 is based on each user interface control's distance from the attraction icon 312 as well as each user interface control's directional alignment with the attraction icon 312. The user interface controls 322-328 movement from a position next to the edge of the user interface 112 to a position closer to the attraction icon 312 allows for easier manipulation of the user interface controls 322-328. Further, increasing the size of the user interface controls 322-328 also eases manipulation. In some embodiments, only one user interface control will move. In one embodiment, the user interface control nearest the attraction icon 312 will move. In another embodiment, the user interface control in rotational alignment with the attraction icon 312 will move.

Figure 3F:
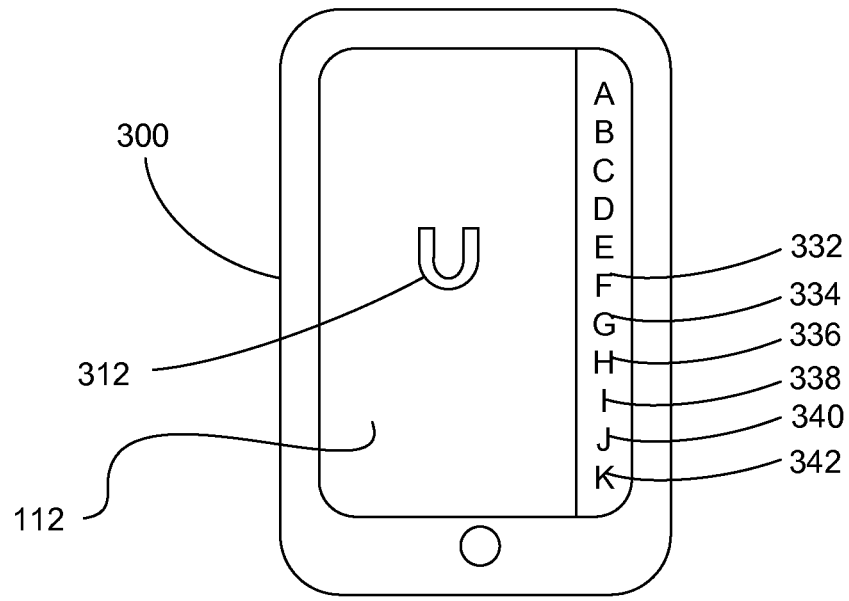
FIG. 3F depicts another embodiment of a user interface of a mobile computing device showing an attraction icon and several user interface controls located at a side perimeter of the user interface.

FIG. 3F depicts another embodiment of a user interface 112 of a mobile computing device 300 showing an attraction icon 312 and several user interface controls 332-342 located at a side perimeter of the user interface 112. In this embodiment, the user interface controls 332-342 are a portion of an alphabetical directory. FIG. 3F displays only the letters A through K of the alphabetical directory. FIG. 3F shows the user interface controls 332-342 in their original positions along the side perimeter of the user interface 112.

Figure 3G:
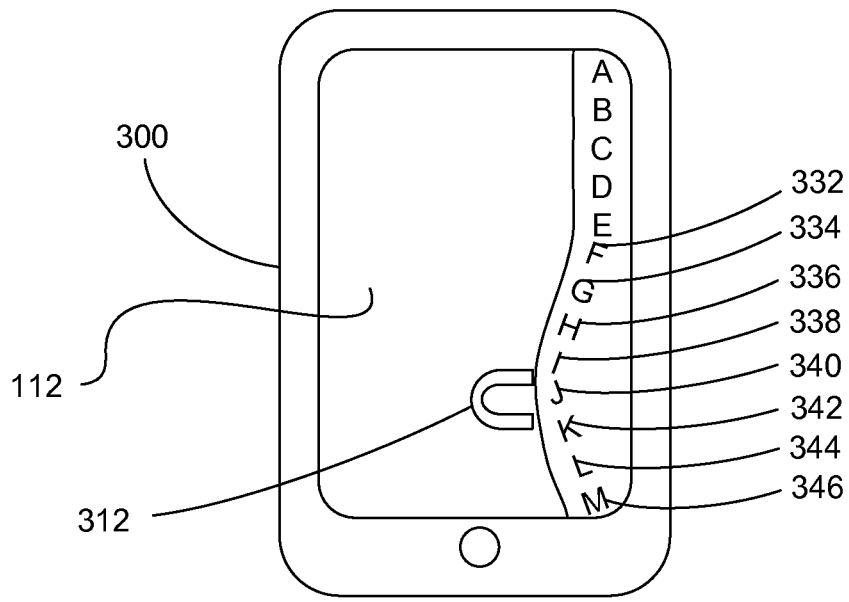
FIG. 3G depicts one embodiment of the mobile computing device of FIG. 3F showing movement of the user interface controls towards the attraction icon including user interface controls not displayed in FIG. 3F.

FIG. 3G depicts one embodiment of the mobile computing device 300 of FIG. 3F showing movement of the user interface controls 332-346 towards the attraction icon 312 including user interface controls 344-346 not displayed in FIG. 3F. In this embodiment, the attraction icon 312 has moved relative to the user interface controls 332-342. The movement of the attraction icon 312, as shown in FIG. 3G, includes translation and rotation from the position of the attraction icon 312 depicted in FIG. 3F. In other embodiments, the movement of the attraction icon 312 may include translating, rotating, resizing, or any other type of movement relative to one or more of the user interface controls 332-342. In this embodiment, the attraction icon 312 is oriented primarily towards the user interface control 340.

In this embodiment, the user interface controls 332-342 are an alphabetical directory and are related to each other spatially. The user interface controls 332-342 maintain alphabetical order even as a user interface control 340 moves from a first position to a second position on the user interface 112. As the user interface control 340 moves from the position depicted in FIG. 3F to the position depicted in FIG. 3G, the user interface controls 338 and 342 maintain a spatial relationship with the user interface control 340. In this embodiment, the alphabetical directory deforms from a vertical list located at a side perimeter of the user interface 112, as shown in FIG. 3F, to a deformed list as depicted in FIG. 3G. In some embodiments, as the list deforms or stretches, additional user interface controls 344 and 346 are displayed on the user interface 112. In some embodiments, the user interface controls 332-346 change in size. In some embodiments, the user interface controls 332-346 change in orientation.

Figure 4:
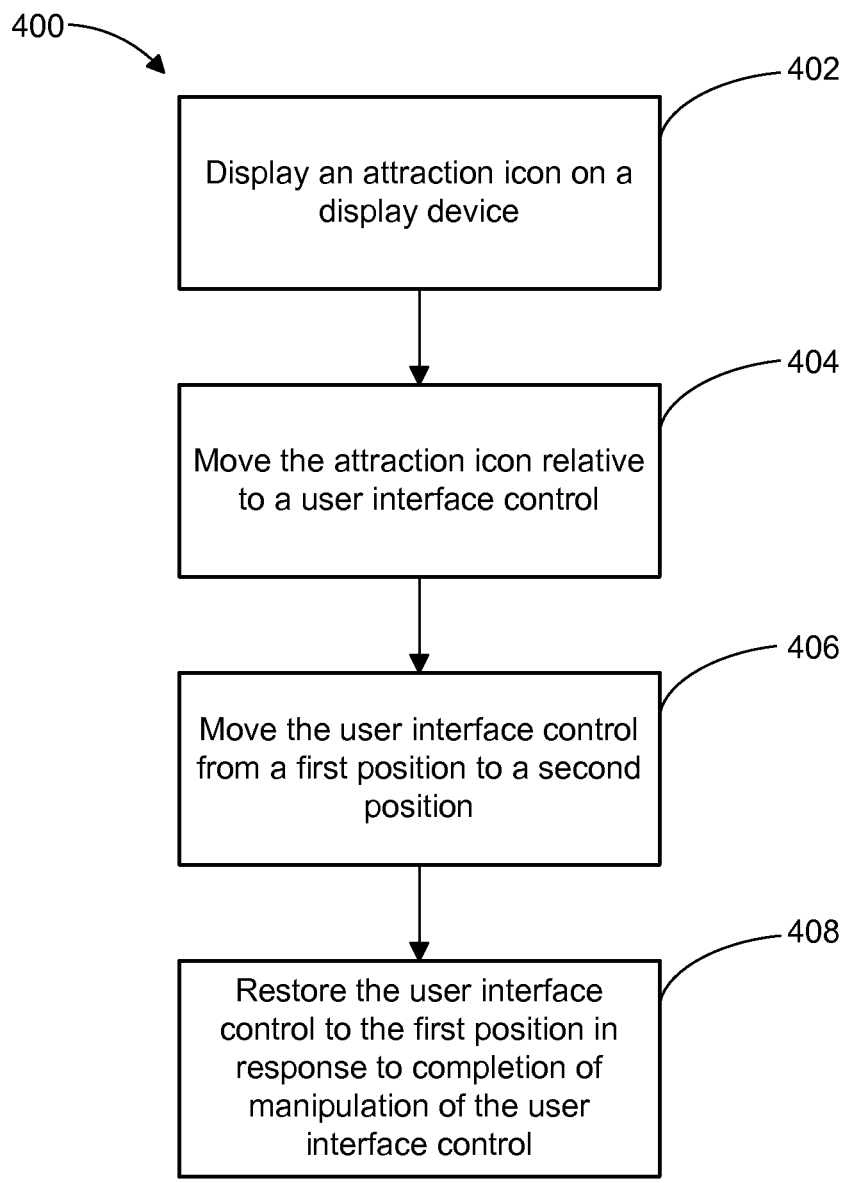
FIG. 4 depicts a schematic diagram of one embodiment of a method for facilitating manipulation of user interface controls on a display.

FIG. 4 depicts a schematic diagram of one embodiment of a method 400 for facilitating manipulation of user interface controls 302-310. Although the method 400 is described in conjunction with the computer system 100 of FIG. 1 and the mobile computing device 300 of FIGS. 3A, 3B, and 3C, embodiments of the method 400 may be implemented with other types of computer systems and devices.

At 402, an attraction icon 312 is displayed on a display device 110. At 404, the attraction icon 312 moves relative to a user interface control 310. At 406, the user interface control 310 moves from a first position to a second position on the display device 110. At 408, the user interface control 310 is restored to the user interface control's first position on the display device 110. The user interface control 310 is restored in response to the user completing manipulation of the user interface control 310. The depicted method 400 then ends. The method enables a user to move the user interface control 310 to a more desirable position on the display device 110.

In some embodiments, the method also may include resizing the user interface control 310, thereby moving the user interface control 310 from the first position to the second position on the display device 110. In some embodiments, the method also may include visually emphasizing the user interface control 310. The visual emphasis may be in response to aligning the attraction icon 312 with the user interface control 310. The alignment may include moving the attraction icon 312 near the user interface control 310 or rotating the attraction icon 312 in a direction towards the user interface control 310 or otherwise logically connecting the attraction icon 312 and the user interface control 310. In some embodiments, the method may also include moving more than one user interface control 302-310, each to a respective second position on the display device 110. In other embodiments, the method may include orienting the attraction icon 312 in a direction towards the user interface control 310.

In some embodiments, the method may further include visually emphasizing more than one user interface control 308-310. A different level of visual emphasis may accompany each user interface control. The level of visual emphasis may depend on any parameter relating the attraction icon 312 and each user interface control 308-310. In one embodiment, the parameter may include a measure of the distance between the attraction icon 312 and the user interface control 310. In another embodiment, the parameter may include a measure of the directional alignment between the attraction icon 312 and the user interface control 310. In some embodiments, the level of visual emphasis depends on the distance and the directional alignment. In some embodiments, the level of visual emphasis increases as the distance between the attraction icon 312 and the user interface control 310 decreases. In other embodiments, the level of visual emphasis increases as the directional alignment of the attraction icon 312 and the user interface control 310 increases.

Embodiments described herein may be implemented on a mobile phone, a smart phone, a portable media device, a tablet computer, a laptop computer, a desktop computer, or other computing device. The embodiments and method(s) described herein may be implemented in all types of computer and mobile applications that include user interface controls.

Embodiments described herein reduce or eliminate user interface errors. Increasing accuracy of the selection of user interface controls reduces user frustration, increases user satisfaction, and increases efficiency.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of an apparatus designed to facilitate manipulation of a user interface control includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising a non-transitory computer useable storage medium including a computer readable program, wherein the computer readable program includes instructions that, when executed by a processing device within a computer, cause the computer to perform operations comprising:
generating an attraction icon on a display device, wherein the attraction icon is different from a default pointer;
moving the attraction icon relative to one of a plurality of user interface controls on the display device in response to a first input by a user, wherein moving the attraction icon comprises translation and rotation;
visually emphasizing the plurality of user interface controls, the plurality of user interface controls having varying levels of visual emphasis based on a parameter relating the attraction icon and each user interface control of the plurality of user interface controls, wherein the parameter comprises a measure of directional rotational alignment between the attraction icon and each user interface control of the plurality of user interface controls and wherein a different directional rotational alignment results in a different level of visual emphasis,
wherein visually emphasizing the plurality of user interface controls includes moving the plurality of user interface controls from a first position on the display device to a second position, the first position located closer to a perimeter of the display device than the second position;
receiving a manipulation, in response to a second input by the user, of the one of the plurality of user interface controls that have been visually emphasized; and
restoring the plurality of user interface controls to the first position in response to completion of the manipulation of the one of the plurality of user interface controls by the user.

2. The computer program product of claim 1, wherein the operations further comprise visually emphasizing the user interface control in response to aligning the attraction icon with the user interface control, wherein aligning the attraction icon comprises rotating the attraction icon relative to the user interface control.

3. The computer program product of claim 1, wherein the moving the user interface control further comprises moving a plurality of user interface controls each to a respective second position.

4. The computer program product of claim 1, wherein the moving the user interface control further comprises resizing the user interface control.

5. The computer program product of claim 1, wherein the operations further comprise visually emphasizing a plurality of user interface controls, wherein each user interface control of the plurality has a level of visual emphasis based on a parameter relating the attraction icon and each user interface control of the plurality, wherein the parameter is a distance between the attraction icon and each user interface control of the plurality and wherein a different distance results in a different level of visual emphasis.

6. The computer program product of claim 1, wherein the moving the attraction icon further comprises orienting the attraction icon in a direction towards the user interface control.

7. A method comprising:
generating an attraction icon on a display device, wherein the attraction icon is different from a default pointer;
moving the attraction icon relative to one of a plurality of user interface controls on a display device in response to a first input by a user, wherein moving the attraction icon comprises translation and rotation;
visually emphasizing the plurality of user interface controls, the plurality of user interface controls having varying levels of visual emphasis based on a parameter relating the attraction icon and each user interface control of the plurality of user interface controls, wherein the parameter comprises a measure of directional rotational alignment between the attraction icon and each user interface control of the plurality of user interface controls and wherein a different directional rotational alignment results in a different level of visual emphasis,
wherein visually emphasizing the plurality of user interface controls includes moving the plurality of user interface controls from a first position on the display device to a second position, the first position located closer to a perimeter of the display device than the second position;
receiving a manipulation, in response to a second input by the user, of the one of the plurality of user interface controls that have been visually emphasized; and
restoring the plurality of user interface controls to the first position in response to completion of the manipulation of the one of the plurality of user interface controls by the user.

8. The method of claim 7, wherein the moving the user interface control further comprises resizing the user interface control.

9. The method of claim 7, wherein the method further comprises visually emphasizing the user interface control in response to aligning the attraction icon with the user interface control, wherein aligning the attraction icon comprises rotating the attraction icon relative to the user interface control.

10. The method of claim 7, wherein the moving the user interface control further comprises moving a plurality of user interface controls each to a respective second position.

11. The method of claim 7, wherein the method further comprises visually emphasizing a plurality of user interface controls, wherein each user interface control of the plurality has a level of visual emphasis based on a parameter relating the attraction icon and each user interface control of the plurality, wherein the parameter is a distance between the attraction icon and each user interface control of the plurality and wherein a different distance results in a different level of visual emphasis.

12. The method of claim 7 wherein the moving the attraction icon further comprises orienting the attraction icon in a direction towards the user interface control.

13. An apparatus within an electronic data processing system wherein the apparatus comprises:
an attraction icon generator configured to generate an attraction icon on a display device, wherein the attraction icon is different from a default pointer;
an icon mover configured to move the attraction icon relative to one of a plurality of user interface controls on the display device in response to a first input by a user, wherein move the attraction icon comprises translation and rotation;

a highlighter configured to visually emphasize the plurality of user interface controls, the plurality of user interface controls having varying levels of visual emphasis based on a parameter relating the attraction icon and each user interface control of the plurality of user interface controls, wherein the parameter comprises a measure of directional alignment between the attraction icon and each user interface control of the plurality of user interface controls and wherein a different directional alignment results in a different level of visual emphasis, wherein visually emphasize the plurality of user interface controls includes a control mover configured to move the plurality of user interface controls from a first position on the display device to a second position, the first position located closer to a perimeter of the display device than the second position; and a restorer configured to restore the plurality of user interface controls to the first position in response to a second input by the user, the second input comprises a completion of a manipulation of the one of the plurality of user interface controls by the user.

14. The apparatus of claim 13, wherein the control mover is further configured to resize the user interface control and the restorer is further configured to restore the user interface control to an original size of the user interface control in response to completion of the manipulation of the user interface control by the user.

15. The apparatus of claim 13, wherein the apparatus further comprises a highlighter configured to visually emphasize the user interface control in response to aligning the attraction icon with the user interface control, wherein aligning the attraction icon comprises rotating the attraction icon relative to the user interface control.

16. The apparatus of claim 13, wherein the apparatus further comprises a grouper configured to group a plurality of user interface controls and the mover is further configured to move the plurality of user interface controls to the second position.

17. The apparatus of claim 13, wherein the apparatus further comprises a highlighter configured to visually emphasize a plurality of user interface controls, wherein each user interface control of the plurality has a level of visual emphasis based on a parameter relating the attraction icon and each user interface control of the plurality, wherein the parameter is a distance between the attraction icon and each user interface control of the plurality and wherein a different distance results in a different level of visual emphasis.

* * * * *